United States Patent Office 3,375,241
Patented Mar. 26, 1968

3,375,241
FIBER REACTIVE DYESTUFFS
Edgar Siegel, Leverkusen, and Klaus Sasse, Cologne-Stammheim, Germany, assignors to Farbenfabriken Bayer Aktiengesellschaft, Leverkusen, Germany
No Drawing. Filed Feb. 13, 1962, Ser. No. 172,857
Claims priority, application Germany, Feb. 27, 1961, F 33,299
12 Claims. (Cl. 260—154)

The present invention relates to novel and valuable dyestuffs; more particularly it relates to dyestuffs of the general formula

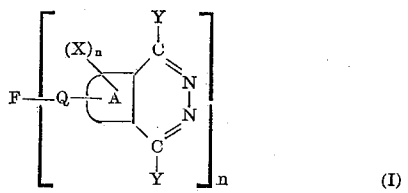

In the above Formula F denotes the radical of an organic dyestuff, Q stands for a simple bond or any bridge member, A denotes a five- or six-membered carbocyclic or heterocyclic ring, X denotes hydrogen or a substituent, the one Y denotes a halogen atom, the other Y hydrogen, halogen or an organic radical, $m$ stands for an integer, and $n$ for a number from 1 to 3.

It is an object of this invention to provide new valuable dyestuffs and processes for their manufacture; another object is the provision of new fibre reactive dyestuffs which are particularly useful for the dyeing and printing of cellulose-containing textile materials. A further object is the provision of new dyestuffs which exhibit outstanding wet fastness properties when dyed or printed on OH-group containing materials according to methods known for fibre reactive dyestuffs. Still another object is the provision of a method for dyeing textile materials, particularly cellulose-containing textile fibres with the novel fibre reactive dyestuffs. It is also an object of the invention to provide textile materials, particularly cellulose-containing fibres which are dyed and printed very fast to wet processing and which possess excellent general fastness properties. Other objects will become evident from the following description.

The dyestuffs of Formula I may belong to a great variety of classes, for example to the series of the metal-free or metal-containing mono- or polyazo dyestuffs, metal-free or metal-containing azaporphin dyestuffs, preferably phthalocyanine dyestuffs, of the anthraquinone, oxazine, dioxazine, triphenylmethane, nitro, azomethine, benzanthrone and dibenzanthrone dyestuffs as well as polycyclic condensation products of the latter.

In the dyestuffs of the general Formula I the radical

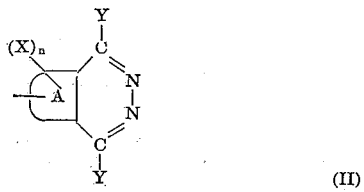

can be linked to the dyestuff molecule either directly or via any desired bridge members.

Of bridge members the following may be mentioned, for example sulphonamide, sulphonylamino, carboxamide, carbonylamino, arylenamino groups and amino groups which may be substituted by alkyl, aryl, arakyl or acyl groups, bis-acylimide groups such as bis-sulphonyl-imide groups and sulphonyl-carboxylimide or sulphonyl-triazinyl- or -pyrimidinyl-imide groups, furthermore urea and urethane groupings, heterocyclic ring systems, such as triazinylamino and pyrimidinylamino radicals which may contain reactive halogen atoms as well as oxygen and sulphur atoms, and the azo grouping. Of particular importance are those dyestuffs in which the residue (II) is linked with the dyestuff via an optionally at the nitrogen atom substituted sulfonamide or carbonamide group, the

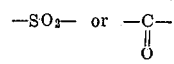

group of which is bound to the nucleus A.

The bridge member may connect the radical F with the ring system A either via two or via three linking positions, whereby in the latter case, for instance a 5- or 6-membered ring which is condensed with the nucleus A and which contains exchangeable halogen atoms (e.g., a compound of Formula IV) may be reacted with amino group-containing dyestuffs.

As substituents X the following may be taken into consideration inter alia: optionally substituted alkyl, aralkyl and aryl radicals, sulphonic acid, carboxylic acid and halogen substituents such as chlorine and bromine substituents, furthermore nitro, hydroxy, alkoxy, cyano, sulphone and optionally substituted sulphonamide groups, acid ester groupings such as sulphonic acid and carboxylic acid ester groups. Among the halogen substituents Y in the pyridazine radical, chlorine and bromine substituents are of special interest. If the other Y represents an organic radical, it may be of any desired type, for example, an alkyl-, aralkyl-, aryl- or acylamino group, an alkyl or arylsulphonyl-amino group, furthermore radicals of aliphatic and aromatic hydroxy or mercapto compounds. Y may of course also stand for the radical of a coloured component, i.e., for any desired dyestuff.

Dependent on the type of their substituents, the new dyestuffs of the Formula I can be soluble, insoluble or barely soluble in water. The radical F may contain the substituents usually present in the given dyestuffs such as sulphonic acid, carboxylic acid, optionally substituted sulphonamide, sulphone, alkylamino, aralkylamino, arylamino, acylamino, nitro, cyano, halo, hydroxy, alkoxy, or azo groupings. The dyestuffs may also contain further groupings capable of fixing such as mono- or dihalotriazinylamino, mono-, di- or trihalopyrimidinylamino, esterified sulfonic acid oxalkylamide and esterified hydroxyalkyl sulfone groups, vinylsulfone, sulfofluoride, haloalkylamino and haloacylamino, urethane, unsaturated haloalkyl, urethane or isocyanate groups.

The new dyestuffs may be synthesized according to a great variety of preparative principles. Thus, for example, amino or amide group-containing dyestuffs of preliminary dyestuff products containing a reactive hydrogen atom at the amine or amide nitrogen, may be reacted with compounds of the general Formula II containing in the aromatic or heterocyclic nucleus A a reactive grouping such as a carboxylic acid halide, sulphonic acid halide or isocyanate grouping, and in the case of using preliminary dyestuff products, the latter may be transformed in suitable manner into the desired end dyestuffs. On the other hand the dyestuffs or preliminary dyestuff products containing reactive groupings, for example in the form of sulphonic acid halide, carboxylic acid halide, urethane, ester, haloalkyl and similar groupings, may be reacted with those compounds of the Formula II which contain in the aromatic or heterocyclic nucleus A an amino or amido grouping with reactive hydrogen, and then converted, as far as preliminary dyestuff products are concerned, into the desired end dyestuffs. Particularly in the production of azo group-containing dyestuffs there is the further possibility of using compounds of the general Formula II substituted in the nucleus A by a diazotizable amino group, as diazo component which are coupled in conventional manner with any coupling components and thus used for the synthesis of mono- or polyazo dyestuffs. When applying other methods than those described above, for instance with the formation of oxygen, sulfur or acid ester bridge groupings, a number of other dyestuffs of the general Formula I are obtained, likewise by known preparative methods. Dyestuffs in which the radical of the Formula II is directly linked with F, for example of the azo dyestuffs series, may be built up in such a manner that an aminoaryl compound containing the aryl nucleus directly linked with the nucleus A of the compounds of the general Formula II via a carbon-carbon bond, is diazotised and possibly coupled with azo components.

Depending on the number of the reactive groupings to be used for the reaction and contained in the dyestuff radical or in the preliminary dyestuff product, one or more groupings of the general Formula II may be introduced into the dyestuffs. In the majority of cases, the number $m$ will not exceed 4, but it is also possible to synthesize dyestuffs, especially those having a higher molecular structure, with more than 4, e.g., up to 8 groupings of the Formula II.

Some of the intermediate products of the Formula II are known from the literature. From these, some of the products suitable for the various reaction methods can be built up by subsequent introduction of the appropriate reactive groups, for example by sulphochlorination. However, it is generally advantageous to introduce the desired groups, e.g., carboxylic acid or carboxylic acid chloride, nitro, amino, amide or acylamino groups into the nucleus A of the o-arylene-dicarboxylic acid, prior to the ring closure giving the phthalazine derivative.

In this case, the production of halophthalazines is started, for example, from a 1,2,4- or 1,2,3-benzene-tricarboxylic acid, sulphophthalic acid, nitro- or aminophthalic acid, or from a derivative substituted or acylated at the amino group concerned, this is reacted with hydrazine with the formation of a phthalazine ring, and the free hydrozyl groups are converted, if necessary after transformation of the substituents contained in the nucleus A, into halogen substituents, in the case of a nitro group, for example, after reduction to an amino group. Sometimes it is also possible to combine the transformation of the hydroxyl groups into halogen atoms in one process step with a possibly desired transformation of a substituent contained in the nucleus A, e.g., an amino group, by converting, for example, the amino group-containing dihydroxy compound with phosgene in the presence of dimethyl formamide into the corresponding isocyanate group-containing dihalogen compound.

One of the two halogen substituents in the pyridazine ring can be transformed in the preliminary products or also after the formation of the dyestuff

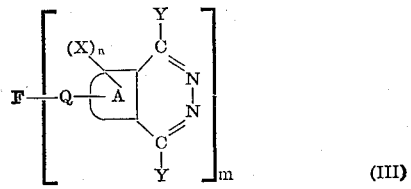

(III)

which F, Q, A, X, Y, $n$ and $m$ have the aforesaid significance, into the radical of an organic compound by reacting in this case with aliphatic, aromatic, or heterocyclic amino, hydroxy or mercapto compounds, for example.

Among the great number of the dyestuffs obtainable according to the invention those products are especially readily obtainable which are derived from amino group-containing azo dyestuffs, of the benzene-azo-benzene, benzene - azo - naphthalene, naphthalene-azo-naphthalene-, benzene-azo-aminopyrazole and -pyrazolone series and of the hetero-azo-aryl series and amino-anthrapquinone series with nuclearly and/or externally linked amino groups by the reaction with compounds of the Formula II containing in the nucleus A a reactive grouping such as a carboxylic acid chloride, sulfonic acid chloride, isocyanate, urethane, halotriazinyl-amino or halopyrimidinyl-amino group. In the same way and in a simple manner, an amino group-containing dyestuff or a dyestuff intermediate may be combined with an amino group-containing dichloro-phthalazine by means of poly-functional acylation agents by, for example, reacting the amino group-containing starting components with phosgene, aliphatic or aromatic dicarboxylic acid halides, cyanuric halides or di-, tri- or tetrahalopyrimidines.

A special case of combining the radical of the Formula II with the dyestuff is attained by starting from a dihalophthalazine derivative with a condensed dihalopyridazine radical, for example of the formula

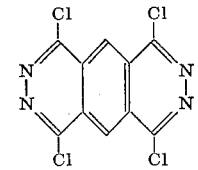

(IV)

and condensing therein at least one of the reactive halogen atoms with an amino group-containing dyestuff or dyestuff intermediate.

It will be understood that a great number of other starting components can be used in the preparation of the novel dyestuffs.

The new dyestuffs are valuable products which are excellently suitable for various purposes of application. As water-soluble compounds they are of special interest for the dyeing of nitrogen-containing and hydroxyl group-containing textile materials, especially of native and regenerated cellulose, wool, silk, synthetic polyamide and polyurethane fibres. On account of the reactive halogen substituents in the pyridazine radical, the products are particularly suitable as reactive dyestuffs for the dyeing of cellulose materials according to the techniques known for this purpose.

For the dyeing of natural and regenerated cellulose the dyestuffs are preferably used in an aqueous solution which may be treated with substances having an alkaline reaction such as alkali metal hydroxide or alkali metal carbonate or with compounds convertible into substances of alkaline reaction such as alkali metal bicarbonate. Further auxiliaries may be added to the solution but they should not react with the dyestuffs in an undesirable manner. Additives of this kind are for example surface-active substances such as alkyl sulfates, substances preventing migration of the dyestuff, dyeing adjuvants such as urea which is to improve the solubility and fixation of the dyestuff, or inert thickening agents such as oil-in-water emulsions, tragacanth, starch, alginate or methyl cellulose.

The solutions or pastes thus prepared are applied to the material to be colored, for example by padding on the foulard (short bath) or by printing, and subsequently heated to an elevated temperature, preferably 40–150° C., for some time. Heating can be effected in the hot flue, in a steaming apparatus, on heated rollers or by introduction into heated concentrated salt baths.

When using a padding or dyeing liquor without alkali the colored dry material is subsequently passed through an alkaline solution to which sodium chloride or Glauber's salt are added. The addition of salt prevents migration of the dyestuff from the fibre.

The material to be dyed can also be pre-treated with one of the aforesaid acid-binding agents, subsequently treated with a solution or paste of the dyestuff and, finally, fixed at an elevated temperature as described above.

In the so-called cold pad batch process, the subsequent heating of the padded fabric can be dispensed with by storing the fabric at room temperature for 4–20 hours. In this process sodium carbonate solution is preferably used as alkali.

For dyeing from a long liquor, the material is introduced into an aqueous solution of the dyestuff (goods-to-liquor ratio 1:5 to 1:40) at room temperature and dyed, if desired while raising the temperature up to 85° C. for 40–90 minutes with the addition in portions of salt, for example sodium sulfate, and subsequently of alkaline substances for example sodium phosphates, sodium carbonate or alkalies.

After fixation the dyed material is rinsed hot and, if required, finally soaped, thereby removing insufficiently fixed dyestuff residues. Dyeings of excellent fastness to wet processing are thus obtained.

For printing materials containing hydroxyl groups, a printing paste is used consisting of the dyestuff solution, a thickening agent, such as sodium alginate, and a compound having alkaline reaction or dissociating alkali on heating, such as sodium carbonate, sodium phosphate, potassium carbonate, potassium acetate or sodium and potassium bicarbonate, the printed material is rinsed and, if desired, finally soaped.

When the dyestuffs, in particular azo dyestuffs, contain groupings forming metal complexes, the fastness properties of the dyeings and prints can in many cases be improved by an after-treatment with metal-yielding agents such as copper salts, for example copper sulfate; chromium, cobalt and nickel salts such as chromium acetate, cobalt sulfate or nickel sulfate.

Textile materials containing amide groups such as wool, silk, synthetic polyamide and polyurethane fibres are in general dyed in the acidic to neutral range according to the dyeing methods conventionally used for this purpose whereby a final increase of the pH value of the dyebath to, for example pH 6.5 to 8.5 is sometimes of advantage.

The dyestuffs are applied to a synthetic polyamide fabric, for example, as solutions or, preferably, in dispersed form and subsequently after-treated together with acid-binding agents in preferably small amounts, such as sodium carbonate. Especially advantageous results are achieved with dyestuffs which are insoluble or barely soluble in water. These are worked up according to conventional techniques and with the addition of known auxiliaries into a dyestuff dispersion and used as such in the dye- or padding-liquor or in a printing paste. Auxiliaries suitable for this application are inter alia compounds preventing the migration of the dyestuff on the fibre such as cellulose ether, alkali metal chlorides and sulfates; wetting agents such as condensation products from ethylene oxide and fatty alcohols or phenols, sulfonated fatty alcohols, solvents such as thiodiglycol; further thickeners such as starch, tragacanth, alginate thickening, gum arabic etc.

After-treatment of the dyeings impregnations and prints obtained on polyamide fibre fabrics is preferably carried out at a temperature of 50–110° C. for 5–60 minutes. In the case where the dyestuffs employed contain groupings forming metal complexes, the fastness properties of the dyeings will sometimes be improved by treating the dyeings with metal-yielding agents such as copper salts, for example copper sulfate, or chromium, cobalt and nickel salts such as chromium acetate, cobalt sulfate or nickel sulfate.

The dyeings and prints obtainable with the new dyestuffs on cellulosic material are, in general, distinguished by good to very good fastness properties, especially by excellent fastness to wet processing, such as to washing to boiling soda and furthermore to water, to rubbing and brushing, to light and in some instances to chlorine and to peroxide. The dyeings and prints on woollen fabrics possess very good fastness to washing, milling, sea-water, hot water and to light. Dyeings and prints on synthetic polyamide fabrics are distinguished by very good fastness to water, washing and light whereas dyeings and prints on synthetic polyester materials, particularly on polyethylene terephthalate, exhibit good fastness to sublimation, to washing and to light.

The following examples are given for the purpose of illustrating the invention, the parts being parts by weight if not otherwise stated.

EXAMPLE 1

Into a solution of 34.7 parts of 2-amino-naphthalene-4,8-disulfonic acid sodium salt and 7 parts of sodium nitrite in 300 parts of water there are introduced with ice cooling 28 parts by volume of concentrated hydrochloric acid, and the mixture is then stirred at 0–10° C. for ½ hour. After removal of excess nitrous acid, 10.7 parts of 3-amino-toluene, dissolved in 10 parts by volume of concentrated hydrochloric acid and 150 parts of water, are added and the coupling is completed by buffering the hydrochloric acid reaction mixture to a pH value of 3–5. The resultant aminoazo dyestuff is salted out, filtered off with suction, washed and then redissolved in 700 parts of water with the addition of a sodium hydroxide solution at a pH value of 7. The aqueous solution is then treated in portions with a total of 26.5 parts of finely powdered 1,4-dichloro-phthalazine-6-carboxylic acid chloride (of M.P. 124–126° C.) and vigorously stirred. By the starting reaction the temperature of the mixture rises to 30° C., the liberated hydrochloric acid is continuously buffered by adjusting the mixture to a pH value of 3–6 with a sodium carbonate solution until free amino groups are no longer indicated. The resultant dyestuff of the formula

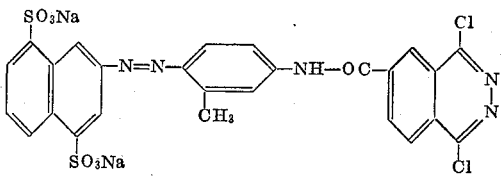

is salted out with 100 parts of sodium chloride, pressed off, washed and dried at 40–50° C. in a vacuum. It is a yellow powder which dissolves in water with a yellow colour.

When a cellulose fabric is printed with a printing paste containing per kilogram 15 g. of the dyestuff, 100 g. of urea, 300 ml. of water, 500 g. of alginate thickening (60 g. of sodium alginate per kg. of thickening), 2 g. of sodium hydroxide and 10 g. of sodium carbonate and made up to 1 kg. with water, dried, steamed at 105° C. for 8 minutes, rinsed with hot water and soaped at the boil, an intense reddish yellow print of good fastness to washing and light is obtained.

EXAMPLE 2

Into a solution of 36.5 parts of the sodium salt of 1-amino-8-hydroxynaphthalene-3,6-disulphonic acid in 100 parts of water there are introduced with good stirring 26.5 parts of finely powdered 1,4-dichlorophthalazine-6-carboxylic acid chloride and the mixture is stirred at 20–40° C. while continuously buffering the liberated hydrochloric acid by maintaining the pH of the mixture at 3–6 until free amino groups are no longer detectable. The dyestuff intermediate thus obtained is coupled, after diluting with 500 parts of water and addition of 12 parts of sodium carbonate, at 5–10° C. with 17.5 parts of diazotised 2-aminobenzene-sulfonic acid, dissolved in 200 parts of water. The dyestuff obtained at a final pH of about 6–7 and having the formula

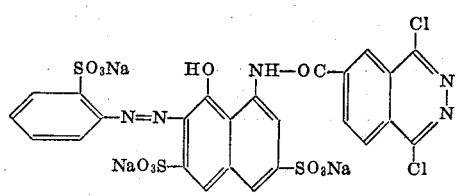

is salted out with 150 parts of sodium chloride, filtered off with suction, washed and dried at 40–50° C. in a vacuum. The dyestuff forms small red needles which very readily dissolve in water with a red colour.

Fabrics of cotton or regenerated cellulose can be dyed with the dyestuff as follows:

50 grams of a cotton skein are dyed in 1 litre of a dyeing liquor containing 1.5 g. of the above dyestuff, by raising the temperature from 20° C. to about 80° C. within 30 minutes, adding a total of 50 g. of sodium chloride in several portions, subsequently introducing 20 g. of trisodium phosphate and treating the material at the same temperature for 60 minutes. After rinsing, soaping at the boil and drying, a clear bluish red dyeing of good fastness to wetting rubbing and light is obtained.

The process may also be carried out by impregnating a cotton fabric with a solution at 20–25° C. containing per litre of liquor 20 g. of the above dyestuff and 0.5 g. of a non-ionic wetting agent (e.g., a polyethoxylated oleyl alcohol), 150 g. of urea and 15 g. of sodium bicarbonate, and then squeezing the fabric between two rubber rollers to a moisture content of about 100%. After intermediate drying at 50–60° C. the material is heated to 140° C. for 10 minutes and the dyeing thus obtained thoroughly rinsed with hot water and treated at the boil for 20 minutes with a solution containing per litre 5 g. of Marseilles soap and 2 g. of sodium carbonate. After rinsing and drying, an intense bluish red dyeing of good fastness to wetting, rubbing and light is obtained.

Similar results are also obtained by operating according to the first-mentioned process of application (dyeing from a long bath), but carrying out the salt addition and the one-hour's after-treatment with trisodium phosphate at room temperature (20–30° C.) instead of at 80° C. The same applies to the last mentioned operation (pad-dyeing) according to which, with the use of 10 g. of sodium carbonate instead of the 15 g. of sodium bicarbonate there employed, and by storing at room temperature for 5 to 20 hours the cellulose fabric squeezed to 100% moisture content instead of the intermediate drying and instead of heating to 140° C., red dyeings with the aforesaid fastness properties are also obtained. In the table following below, including Examples 3 to 7, the shades of other dyestuffs are listed which are synthesised from the likewise indicated diazo components, coupling components and reactive components linkable with the amino group in the latter in analogy to the data given in Example 2 or, alternatively, by the reaction of the corresponding aminoazo dyestuffs with the reactive components, and which can be dyed or printed on cellulose materials according to one of the processes described above.

there are introduced with good stirring 26.5 parts of finely powdered 1,4-dichlorophthalazine-6-carboxylic acid chloride and the mixture is stirred at 20–40° C. while continuously buffering the liberated hydrochloric acid by keeping the pH value of the mixture at 3–6 until a sample, upon diazotising and coupling with 1-hydroxy-naphthalene-4-sulfonic acid, yields a uniform yellowish red shade. After the addition of ice, the resultant intermediate dyestuff product is directly diazotised with 7 parts of sodium nitrite and 28 parts of concentrated hydrochloric acid, and subsequently combined with a previously prepared solution of 47 parts of the sodium salt of 1-benzoylamino-8-hydroxy-naphthalene-3,6-disulfonic acid and 12 parts of sodium carbonate in 200 parts of water, whereby the coupling takes place, yielding the dyestuff

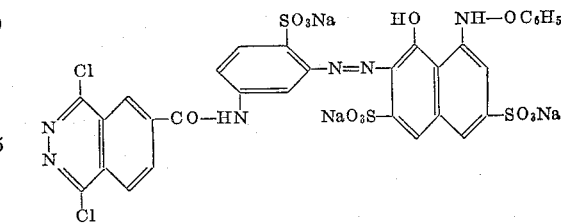

which is salted out, filtered off with suction, washed and dried at 40–50° C. in a vacuum. The dyestuff readily dissolves in water with a red colour and yields, according to one of the processes described above, clear bluish red dyeings and prints on cellulose materials.

When a fabric of synthetic polyamide fibres is dyed at the boil for one hour in a bath having a goods-in-liquor ratio 1:30 and containing 2% of the above-mentioned dyestuff (referred to the weight of the material to be dyed) and 2% of formic acid (referred to the weight of the material to be dyed), there is obtained after rinsing a clear bluish red dyeing of good wet fastness properties.

In the table following below the shades and the pH value of their coupling medium are listed of dyestuffs which can be obtained in analogy to the data given in Example 8 from a diazo component containing a further amino group, from a coupling component and a reactive component linkable with the free amino group of the

| Diazo component | Coupling component | Reactive component | Colour |
|---|---|---|---|
| 1-aminobenzene-2-sulphonic acid | 1-amino-8-hydroxy-naphthalene-3,6-disulphonic acid | 1,4-dichlorphthalazine-6-carboxylic chloride | Red. |
| 1-aminobenzene-2,5-disulphonic acid | 1-(3'-aminobenzoyl-amino)-8-hydroxy-naphthalene-3,6-disulphonic acid | do | Red. |
| 1-amino-4-methyl-benzene-2-sulphonic acid | 1-amino-8-hydroxynaphthalene-3,6-disulphonic acid | do | Red. |
| 1-aminobenzene-2-sulphonic acid | 2-amino-5-hydroxynaphthalene-7-sulfonic acid | do | Orange. |
| 1-amino-4-acetyl-aminobenzene-6-sulphonic acid | do | do | Scarlet. |

EXAMPLE 8

Into a solution of 21 parts of the sodium salt of 1,3-diaminobenzene-6-sulphonic acid in 100 parts of water diazo component. For the dyeing and printing of cellulose materials with the dyestuffs of the table the above-mentioned processes may be used.

| Example No. | Diazo component | Coupling component | Reactive component | Shade |
|---|---|---|---|---|
| 9 | 1,3-diaminobenzene-4-sulphonic acid | 1-(3'-sulphophenyl)-3-methyl-5-pyrazolone | 1,4-dichlorphthalazine-6-carboxylic acid chloride | Yellow. |
| 10 | do | 1-(2',5'-dichlor-4'-sulphophenyl)-3-methyl-pyrazolone-5 | do | Do. |
| 11 | do | 1-(3'-sulphophenyl)-3-methyl-pyrazolone-5 | do | Do. |
| 12 | do | 2-acetylamino-5-hydroxy-naphthalene-7-sulphonic acid | do | Orange. |

EXAMPLE 13

51.6 parts of the dyestuff of the formula

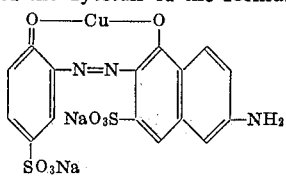

(obtained by diazotising 1-hydroxy-2-aminobenzene-4-sulphonic acid and coupling with 2-amino-5-hydroxy-naphthalene-7-sulphonic acid in water/pyridine in the presence of sodium carbonate, and subsequent treatment with a copper-yielding agent) are dissolved in 1500 parts of water at a pH of 7. A total of 27 parts of finely powdered 1,4-dichlorophthalazine-6-carboxylic acid chloride is introduced in portions at 20–20° C. with good stirring, and the liberated hydrochloric acid is continuously buffered by adjusting the pH of the mixture, with a sodium carbonate solution, to 3–6. When free amino groups are no longer detectable, the resultant reactive dyestuff of the formula

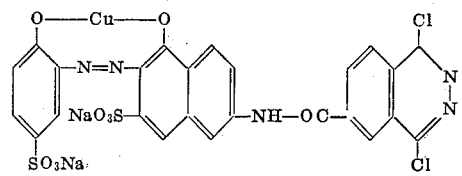

is salted out, pressed off, washed and dried at 40–50° C. in a vacuum. Fabrics of cellulose materials can be dyed or printed with this dyestuff according to one of the aforesaid processes yielding ruby red shades fast to wetting, rubbing and light.

In the preceding procedure, 1-hydroxy-2-aminobenzene-4,6-disulphonic acid may be used in place of 1-hydroxy-2-aminobenzene-4-sulphonic acid.

EXAMPLE 14

96 parts (referred to a 100% material) of the copper phthalocyanine tetrasulphochloride prepared in conventional manner by the reaction of chlorosulphonic acid and thionyl chloride with copper phthalocyanine, or of the isomeric copper phthalocyanine tetrasulphochloride obtained from 1-sulpho-benzene-3,4-dicarboxylic acid via the corresponding copper phthalocyanine tetrasulphonic acid, are suspended in the form of the moist, thoroughly washed filter cake in 500 parts of water and 500 parts of ice, a solution of 50 parts of the sodium salt of 1,3-diaminobenzene-4-sulphonic acid in 500 parts of water is added and the pH value is adjusted to 8.5 with sodium carbonate. The suspension is stirred at room temperature for 24 hours and the pH value is maintained at 8.5 by the continuous addition of sodium carbonate. The resultant condensation product is precipitated at a pH of 1–2 by the addition of sodium chloride, filtered off with suction, washed and redissolved neutral in 1000 parts of water. To the blue solution, a solution of 80 parts of 1,4-dichlorophthalazine-6-carboxylic acid chloride in 300 parts of benzene is added dropwise with intense stirring, and further stirred at 30–40° C. while continuously buffering the liberated hydrochloric acid with a sodium carbonate solution and thus adjusting the pH value of the mixture to 4–6, until free amino groups are no longer detectable. The reactive dyestuff thus obtained and having the formula

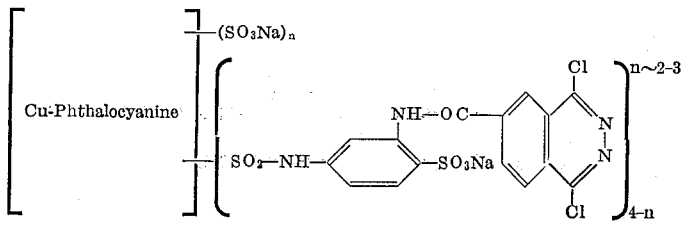

is salted out, washed and dried at 30–40° C. in a vacuum. It is a dark blue powder which dissolves in water with a blue colour and dyes cotton and regenerated cellulose in clear blue shades of good fastness to wetting, rubbing and light according to one of the aforesaid dyeing or printing processes.

Instead of 96 parts of copper phthalocyanine tetrasulphochloride, there may also be employed, by otherwise the same method of operation as in Example 14, 87 parts (referred to 100% material) the copper or nickel phthalocyanine trisulphochloride, obtainable by the reaction of chlorosulphonic acid with copper or nickel phthalocyanine, in the form of a moist filter cake thoroughly washed with ice water, reactive dyestuffs also yielding clear blue shades are thus obtained.

When starting from 4', 4'', 4''', 4''''-tetraphenyl-Cu-phthalocyanine, there is obtained after sulphochlorination and reaction with 1,3-diaminobenzene-4-sulfonic acid and acylation with 1,4-dichlorophthalazine-6-carboxylic acid chloride, a reactive dyestuff which dyes cellulose material in the presence of acid-binding agents in clair green shades fast to wetting and light.

EXAMPLE 15

53.5 parts of the amino-anthraquinone dyestuff obtained by the reaction of 1-amino-4-bromo-anthraquinone-2-sulphonic acid with 1,3-diaminobenzene-4-sulfonic acid are dissolved in 700 parts of water, 27 parts of finely powdered 1,4 - dichlorophthalazine - 6-carboxylic acid chloride are introduced at 20–30° C. with good stirring, and a pH of 3–6 is maintained by the continuous addition of a sodium carbonate solution. When amino groups are no longer detectable, the resultant dyestuff of the formula

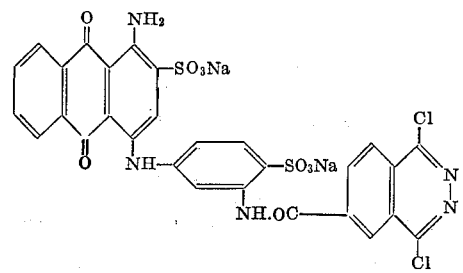

is salted out, filtered off with suction, washed and dried at 40° C. in a vacuum. It dyes cotton and regenerated cellulose in blue shades fast to wetting, rubbing and to light according to one of the processes described above.

Other dyestuffs of the present invention include those which in the free acid state corresponds to the following formulas:

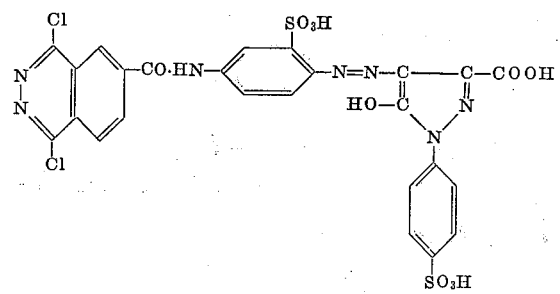

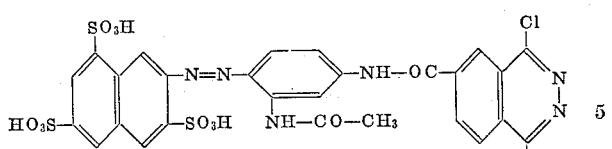

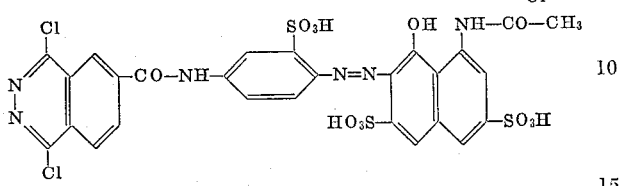

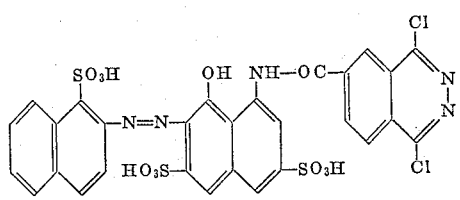

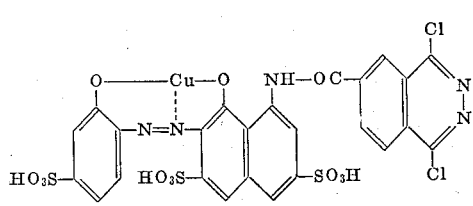

We claim:
1. A dyestuff of the formula:

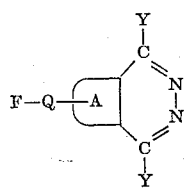

wherein F is a water-soluble metal-free monoazo dyestuff; A is a six-membered carbocyclic ring having three conjugated double bonds; Q stands for member selected from the group consisting of —NHOC— and —NHO$_2$S—; and Y is a halogen atom selected from the group consisting of Cl and Br.

2. A dyestuff of claim 1 wherein F is the residue of a sulfonic acid group-containing metal-free monoazo dyestuff.

3. A dyestuff of the formula

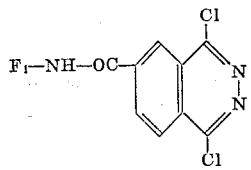

wherein F$_1$ is a water-soluble metal-free monoazo dyestuff.

4. A dyestuff of the formula

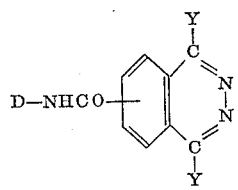

wherein D stands for a water-soluble metal-free monoazo dyestuff and Y stands for a halogen selected from the group consisting of chlorine and bromine.

5. A dyestuff of the formula

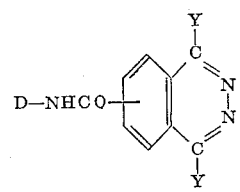

wherein D stands for a water-soluble metal-containing monoazo dyestuff and Y stands for a halogen selected from the group consisting of chlorine and bromine.

6. A dyestuff of the formula

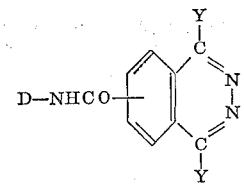

wherein D stands for a water-soluble anthraquinone dyestuff and Y stands for a halogen selected from the group consisting of chlorine and bromine.

7. The dyestuff which in the free acid state corresponds to the formula

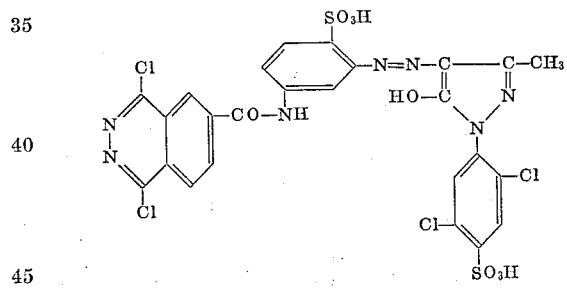

8. The dyestuff which in the free acid state corresponds to the formula

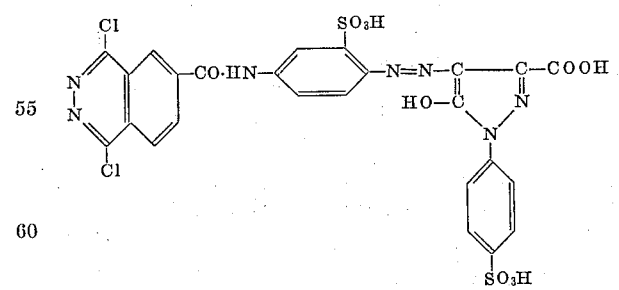

9. The dyestuff which in the free acid state corresponds to the formula

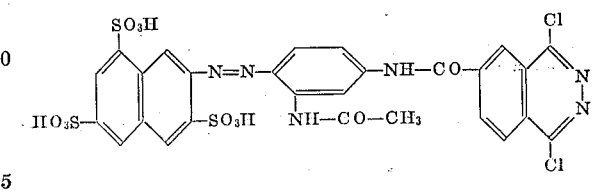

10. The dyestuff which in the free acid state corresponds to the formula

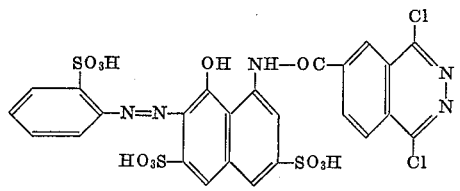

11. The dyestuff which in the free acid state corresponds to the formula

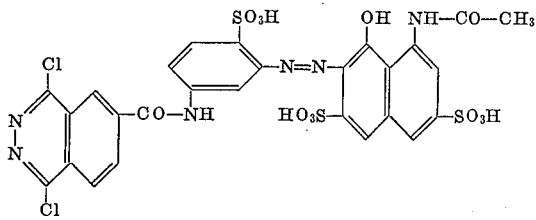

12. The dyestuff which in the free acid state corresponds to the formula

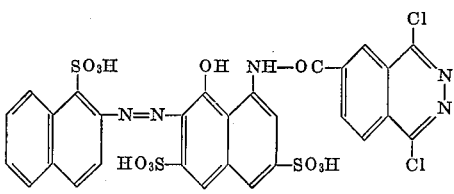

References Cited

UNITED STATES PATENTS 1,886,480  11/1932  Haller et al. _____ 260—153

FOREIGN PATENTS 1,247,660  10/1960  France.
315,451  7/1929  Great Britain.

CHARLES B. PARKER, *Primary Examiner.*

LEON ZITVER, *Examiner.*

R. J. FINNEGAN, D. M. PAPUGA,
*Assistant Examiners.*